United States Patent [19]
Garduno

[11] Patent Number: 5,830,536
[45] Date of Patent: Nov. 3, 1998

[54] CREAM CRYSTALLIZER STONE FLOOR MAINTENANCE COMPOSITION AND METHOD

[75] Inventor: Marlen Torrescano Garduno, Toluca, Mexico

[73] Assignee: S. C. Johnson Commercial Markets, Inc., Sturtevant, Wis.

[21] Appl. No.: 805,487

[22] Filed: Feb. 26, 1997

[51] Int. Cl.$^6$ .................................................. B05D 5/00
[52] U.S. Cl. ................... 427/387; 427/393.6; 427/429; 510/240; 134/3
[58] Field of Search .................. 510/240; 134/3; 427/393.6, 429, 387

[56] References Cited

U.S. PATENT DOCUMENTS

| | | |
|---|---|---|
| 90,754 | 6/1869 | Ivers et al. . |
| 133,095 | 12/1872 | Hagget et al. . |
| 145,971 | 12/1873 | Sawyer . |
| 181,790 | 9/1876 | Love . |
| 370,551 | 9/1887 | McCarthy . |
| 542,524 | 7/1895 | Hutchinson et al. . |
| 1,574,406 | 2/1926 | Nelson . |
| 3,481,879 | 12/1969 | Salomone ................................ 252/136 |
| 4,297,148 | 10/1981 | Zervopoulos ............................... 134/3 |
| 4,738,876 | 4/1988 | George et al. ........................... 427/299 |
| 4,756,766 | 7/1988 | Thrower ...................................... 134/3 |
| 5,282,900 | 2/1994 | McDonell et al. ........................... 134/2 |
| 5,490,883 | 2/1996 | McLaren et al. ............................. 134/3 |

FOREIGN PATENT DOCUMENTS

| | | |
|---|---|---|
| 290132 | 11/1988 | European Pat. Off. . |
| 617099 | 9/1994 | European Pat. Off. . |

OTHER PUBLICATIONS

Hoechst Celanese Corporation publication "Floor Formula Bulletin, Formula 1401"—published 1985.

Article from Batiment Entretin entitled "Crystallization of Marble Stone"—Jan./Feb. 1985.

Article from Batiment Entretien entitled "Brilliant Marble: Is it Easy to Obtain?"—No. 147, Jan./Feb. 1990.

*Primary Examiner*—Erma Cameron
*Attorney, Agent, or Firm*—R. E. Rakoczy; R. J. Rymarz

[57] ABSTRACT

This invention provides a composition and method for maintaining the appearance of stone floor surfaces such as marble that avoids the need for use of oxalic acid. This is provided by a stone floor surface crystallizer composition comprising from about 12% to 25% of a silicofluoride crystallizing agent such as magnesium silicofluoride; from about 15% to 25% of at least one fatty acid containing from about 16 to 22 carbon atoms such as stearic acid or mixtures of palhitic, stearic and oleic acids; from about 25% to 45% of at least one particulate abrasive, more preferably, an aluminum oxide abrasive; from about 80% to 140%, based upon the stoichiometric amount of carboxyl groups present in the fatty acid of the composition, of at least one alkaline neutralizing agent for the fatty acid such as a volatile amine such as triethanolamine; from about 0.1% to 2%, of a silicone fluid such as polydimethylsiloxane fluid having a viscosity of from about 100 to 2000 centistokes (0.01 to 0.2 square meters per second) at 20° C.; and the balance of the composition comprises water.

18 Claims, No Drawings

CREAM CRYSTALLIZER STONE FLOOR MAINTENANCE COMPOSITION AND METHOD

BACKGROUND OF THE INVENTION

1. Technical Field

This invention relates to a composition and method for maintaining the appearance of stone floor surfaces such as marble that avoids the need for use of oxalic acid.

2. Background Art

Marble is a natural stone that is frequently used as a floor surface. Due to its characteristics, it is considered on of the best stone materials in terms of durability and appearance, but it requires some degree of maintenance as a floor surface.

In spite of its durability and hardness, marble is very sensitive to acids and abrasive oils. These materials can both easily and irreversibly damage marble. The marble floor that is exposed to floor traffic must receive certain considerations and care when dirt is removed to maintain the attractive characteristics of the floor such as shine. Similar considerations apply to other types of stone floors such as terrazzo, magnesite, limestone, concrete and granite. A great variety of stone maintenance products have been developed and tried.

Resins and wax pastes of the type used on wood or vinyl flooring are not adequate for marble floors. Some waxes exist that are modified with acrylic monomers or polymers and are periodically used on marble floors. However, they have the disadvantage of a short-lasting life that can be due to adhesion problems, require continuous maintenance, and provide the marble with an artificial appearance.

A more commonly used type of marble floor maintenance product is a paste composition based on oxalic acid that forms calcium oxalate crystals in the marble surface ("a crystallizer" or sometimes called an "acid conditioning agent"). It is applied directly on the floor with motor-driven rotary abrasive pads and has the advantage of providing a great amount of gloss to the floor surface at a very low cost. This type of product is very good at restoring marble floor surfaces that have been damaged in appearance due to low maintenance or high floor traffic. One example of an oxalic acid-containing aqueous emulsion marble floor maintenance product is Pasta Liquido Blanca sold by S. C. Johnson & Son, Inc. in Mexico and Asia that contains about 66% oxalic acid and an aluminum oxide abrasive that is suspended in an aqueous emulsion using stearic acid.

U.S. Pat. No. 4,738,876 to George et al. teaches a two step method for treating stone surfaces such as marble using an oxalic acid-containing composition followed by rotary buffing with a composition containing a crystallizing agent such as magnesium hexafluorosilicate or zinc hexafluorosilicate as a floor surface crystallizer. George et al. further teaches that other types of acid conditioning agents can be used in the first step such as citric acid, tartaric acid, hydrochloric acid and other mineral acids.

Other examples of acid-containing compositions used to clean or treat stone are found in U.S. Pat. Nos. 90,754 to Ivers, et al.; 133,095 to Haggett et al.; 145,971 to Sawyer; 181,790 to Love; 370,551 to McCarthy; 542,524 to Hutchison; 1,574,406 to Nelson; 3,481,879 to Salamone; 4,297,148 to Zervopoulos and 5,490,883 to McLaren et al.

Oxalic acid has long been the compound of choice for use in marble floor resurfacing, but has a number of disadvantages. A large amount of oxalic acid is generally needed to obtain good floor surface gloss and appearance. Oxalic acid is an aggressive material that produces significant levels of wear on the surface of the marble and thus reduces the lifetime of the floor surface upon repeated maintenance operations. Oxalic acid is an irritating powder. Dusting can be a problem as the composition dries during application by motor-driven abrasive or buffing pads. Oxalic acid-containing products must be removed from the floor as completely as possible. The residual powder, especially when the typical particulate abrasives are also included, tend to dull the floor upon repeated foot traffic and the glossy shine is reduced over time. Oxalic-acid-containing stone floor resurfacing products are labor intensive and typically require from 15–30 minutes to cover one square meter of marble floor surface.

Another approach to maintaining marble floors that are in reasonably good condition, but in need of higher gloss and appearance, involves the use of other types of crystallizer compounds such as those mentioned in the George et al. Patent above: metal silicofluoride compounds such as magnesium or zinc hexafluorosilicate. Such compounds react with the calcium and magnesium carbonate salts in the marble to generate crystals of calcium or magnesium fluoride that actually harden the surface of the marble and enable the development of a harder and higher gloss surface. These compositions are normally provided in the form of abrasive-free liquids that make their application to the floor easier.

Stannic chloride and other metal chlorides, oxychlorides and oxides have also been used to enhance the color of the marble floor and its hardness in an acid conditioning system as noted in the George et al. Patent above.

Examples of the use of fluorosilicate compounds in marble floor maintenance products are given in the George et al. and McLaren et al. Patents noted above as well as in U.S. Pat. No. 4,756,766 to Thrower. A commercial aqueous marble floor maintenance crystallizer product containing 18% magnesium silicofluoride ("magnesium hexafluorosilicate") is TERRANOVA® product sold by S. C. Johnson & Son, Inc. in Spain. While the TERRANOVA® product contains minor amounts of organic and inorganic acids other than oxalic acid, a nonionic polyethoxylated surfactant and magnesium hydroxide as a buffering agent, it does not contain any abrasive or silicone compounds.

Hoechst Celanese Corporation publication "Floor Formula Bulletin, Formula 1401" (published 1985) provides a suggested formula for use as a one step procedure for polishing marble, terrazzo and hydraulic mosaic stone floors to provide a mirror-like surface and increased hardness of stone floors. The composition is composed of 58.0 parts water, 18.0 parts magnesium silicofluoride, 4.0 parts Hostapal® N 100 (nonylphenol with 10 moles of ethylene oxide), and 20.0 parts of Formula 1400. Formula 1400 was described as being a 20% solids cationic dispersion for use as a component for stone polishes composed of 7.0 parts Hoechst Wax 371 FP, 7.0 parts Hoechst Wax KSL, 6.0 parts Ethomeen® O/12 (oleyl amine with two moles of ethylene oxide), 1.0 parts glacial acetic acid, and 79.0 parts of water). Formula 1401 was to be applied to the floor surface by spraying or pouring followed by machine buffing with a steel wool pad until the floor surface is dry and glossy.

Articles from Batiment Entretien entitled "Crystallization of Marble Stone" (Jan./Feb., 1985) and "Brilliant Marble: is it easy to obtain?" (No. 147, Jan./Feb., 1990) teach the maintenance of marble floors using three stages involving scrubbing, leveling/smoothing and crystallization using compounds such as magnesium silicofluoride.

However, one disadvantage of using maintenance products containing silicofluoride compounds instead of those containing acids such as oxalic acid is that such products do not reach the gloss standards needed to replace the need to use oxalic acid-containing floor maintenance products. Additionally, the application of such products is more time-consuming and thus they exceed the labor costs associated with the use of oxalic-acid based products. Furthermore, a heavier duty oxalic acid-based composition is often ultimately needed after repeated treatments with these types of floor maintenance products to bring the gloss and appearance of the floor back to desired levels.

Therefore, there is a need for a marble and stone floor maintenance composition that avoids the disadvantages associated with oxalic acid-based compositions, but that still provides a reasonably fast means to maintain the desirable gloss and appearance of such floors.

BRIEF SUMMARY OF THE INVENTION

One object of this invention is to provide a stone floor maintenance composition, especially for marble floors, that avoids the use of oxalic acid, can be applied in one step, is less labor intensive to use, and still provides such floor surfaces with desirable levels of gloss and appearance.

Another object of this invention is to provide such compositions in a form of a cream that can be easily applied and that tends to stay in a machine-driven, rotary application pad during application to thereby reduce the amount of cleanup of composition needed after the floor maintenance process is completed.

A particularly advantageous object of this invention is to provide a composition that provides a finished floor surface with high gloss, depth of shine and more attractive color that does not need to be restored with strong acid conditioning products on a regular basis.

These and other objects of the present invention are provided by a stone floor surface crystallizer composition comprising A. from about 12% to 25%, more preferably from about 15% to 20%, and most preferably, 18% by weight based upon the total weight of the composition of a silicofluoride crystallizing agent, most preferably magnesium silicofluoride;

B. from about 15% to 25%, more preferably from about 18% to 22%, and most preferably, about 20% by weight based upon the total weight of the composition of at least one fatty acid selected from the group consisting of natural or synthetic fatty acids containing from about 16 to 22 carbon atoms, preferably from 16 to 18 carbon atoms, such as stearic acid or mixtures of palmitic, stearic and oleic acids;.

C. from about 25% to 40%, more preferably from about 25% to 35%, and most preferably, from about 30% to 35% by weight based upon the total weight of the composition of at least one particulate abrasive, more preferably, an aluminum oxide abrasive;

D. from about 80% to 120%, more preferably from about 90% to 110%, and most preferably, from about 100% to 110%, based upon the stoichiometric amount of carboxyl groups present in the fatty acid of the composition, of at least one alkaline neutralizing agent for fatty acid (B), more preferably a volatile amine such as triethanolamine;

E. from about 0.1% to 2%, more preferably from about 0.1% to 1%, even more preferably from about 0.1% to 0.5%, and most preferably, about 0.25% by weight based upon the total weight of the composition of a silicone fluid such as polydimethylsiloxane the following fluid having a viscosity of from about 100 to 2000 centistokes (0.0001 to 0.002 square meters per second-m$^2$/s) at 20° C., more preferably, from about 250 to 1000 centistokes (0.00025 to 0.001 m$^2$/s), and, most preferably, about 500 centistokes (0.0005 m$^{2/}$s); and F. the balance of the composition comprises water.

More preferably, the abrasive, fatty acid and neutralizing agent are added to the composition as an aqueous dispersion.

More preferably, the composition has the appearance of a cream and further contains minor amounts of less aggressive acid conditioning agents such as phosphoric acid and tartaric acid, buffering agents such as magnesium hydroxide, surfactants, and, optionally, aqueous wax dispersions.

This invention also relates to a method of improving the appearance of stone floors through the application of the above compositions to floor surfaces, especially those of marble and terrazzo.

DETAILED DESCRIPTION OF THE INVENTION

The aqueous stone floor surface crystallizer compositions of the present invention require five ingredients plus water to achieve the objects of this invention.

The first required ingredient is a conventional metal salt silicofluoride crystallizing compound such as magnesium silicofluoride ($MgSiF_6$ or magnesium hexafluorosilicate). Such compounds react with the calcium and magnesium compounds in the stone floor surface to form crystals that harden the surface and enable the development of a high gloss and attractive appearance. Examples of other such crystallizing compounds include zinc hexafluorosilicate although any other silicofluoride crystallizing compound may find use in the compositions of the present invention. The most preferred crystallizing compound is magnesium silicofluoride. The crystallizing compound comprises from about 12% to about 25% by weight of the total composition, more preferably from about 15% to 20% and, most preferably, 18%. Floor surface gloss levels were reduced as compared with oxalic acid treatments at the lower limit while more than about 21% of the magnesium silicofluoride resulted in compositions that were more increasingly difficult to apply with motor-driven machinery and gave less uniform, floor surface gloss levels.

The second required ingredient is at least one fatty acid selected from the group consisting of natural or synthetic fatty acids containing from about 16 to 22 carbon atoms, more preferably from 16 to 18 carbon atoms, such as stearic acid or mixtures of palmitic, stearic and oleic acids. As is well known in the art, fatty acids are typically mixtures of one or more fatty acids of varying chain lengths, especially for naturally-derived fatty acids.

The fatty acid serves several purposes in the composition of this invention. One is to act as a suspending agent for the abrasive used in the compositions of the present invention. The carboxyl groups present in the fatty acid are neutralized to from about 80% to about 120% of the stoichiometric amount with a neutralizing agent to form a suspending soap or surfactant.

Another purpose for the fatty acid is to provide a waxy, solid material that can fill in some of the minor scratches in the stone or marble surface being maintained to provide a more attractive, smooth looking appearance. This enables the composition to repair scratches in the marble surface and extend the time before any harsher treatment such as with oxalic acid-based compositions becomes a necessity to restore the floor surface to its original condition.

A particularly preferred fatty acid mixture for use in the present invention is a double pressed fatty acid composed of about 3% oleic acid, and the balance a ratio of about 55:45 parts by weight of palmitic acid and stearic acid. These are commercially available materials.

The fatty acid, particularly free fatty acid, can also act as a lubricating agent to assist in the polishing process. The amount of free fatty acid present can be adjusted by the neutralization level selected. However, very little free fatty acid is desirable in the aqueous emulsion of abrasive.

The third required ingredient is from about 25% to 45%, more preferably from about 25% to 35%, and most preferably, from about 30% to 35% by weight based upon the total weight of the composition of at least one particulate abrasive, more preferably, an aluminum oxide abrasive. Conventional abrasives of the type commonly used in stone floor finishing and polishing compositions can be used such as boron carbide, silica, quartz, and talc as well as aluminum oxide.

Aluminum oxide is presently preferred as a particulate abrasive material. One such material that was found to be useful had an analysis of 95% $Al_2O_3$, 1.5% $SiO_2$, 0.5% $Fe_2O_3$, and 3.0% $TiO_2$; a mohs hardness of 9.0; and an average particle size of +325 mesh (at least 98% of the aluminum oxide abrasive had an average particle size of less than 44 microns).

The abrasive is used to simultaneously scratch the floor surface to enable better treatment of the underlying stone as well as to grind and polish the surface to provide the desirable appearance (e.g., more clarity and depth of gloss) observed on floor surfaces treated with the compositions of the present invention. Abrasives are not typically used in combination with a silicofluoride compound as a one step floor maintenance product.

This invention thus enables several operations to be accomplished at once. It also reduces the need for an extensive grinding and treating operation such as is commonly done when abrasive-containing oxalic acid-based compositions are used to restore more heavily damaged marble floor surfaces.

The fourth required ingredient is from about 80% to 140%, more preferably from about 90% to 130%, and most preferably, from about 100% to 130%, based upon the stoichiometric amount of carboxyl groups present in the fatty acid of the composition, of at least one alkaline neutralizing agent for the fatty acid. A variety of alkaline neutralizing agents can be employed such as organic and inorganic bases such as lower alkyl amines such as ethylmamine, dimethylamine, triethylamine, isopropylamine, diethanolamine, triethanolamine, dimethylethanolamine, diethylaminoethanol, 2-amino-2-methyl-1,3-propanediol, 2-amino-2-methyl-1-propanol, morpholine, ammonium hydroxide, alkali metal hydroxides such as sodium or potassium hydroxide, with volatile bases being more preferred and triethanolamine being presently preferred. Mixtures of one or more such neutralizing agents can also be used.

The fifth required ingredient is from about 0.1% to 2%, more preferably from about 0.1% to 1%, even more preferably from about 0.1% to 0.5%, and most preferably, about 0.25% by weight based upon the total weight of the composition of a silicone fluid such as polydimethylpiioxane fluid having a viscosity of from about 100 to 2000 centistokes (0.0001 to 0.002 $m^2/s$) at 20° C. more preferably, from about 250 to 1000 centistokes (0.00025 to 0.001 $m^2/s$), and most preferably, about 500 centistokes (0.0005 $m^2/s$).

The silicone fluid is used in an amount that is effective to provide a higher depth of gloss to the floor surface than is obtained without such an additive, but not to the extent that the floor surface is left unacceptably slippery or greasy. For polydimethylsiloxane fluid, the depth of gloss on marble floor surfaces was not much improved at a fluid viscosity of about 100 centistokes (0.0001 $m^2/s$). The marble floor surface had good depth of gloss, but was too slippery or fast when the viscosity of the fluid was about 1000 centistokes (0.001 $m^2/s$). This contributes to the overall unique and attractive appearance of stone floors finished with the compositions of the present invention. The nature of the fluid used will determine the actual viscosity of useful silicone fluids in this invention since, as is well-known, hydroxy-endblocked silicone fluids tend to have higher general viscosities for a given molecular weight than do trimethylsilyl-endblocked polydimethylsiloxane fluids. The improvement in depth of gloss and also with the color of the stone with the use of such silicone compounds was particularly noticeable on marble of green color.

The balance of the required composition comprises water. Sufficient water is used to produce a composition having the consistency of a cream that is readily spread across a floor surface and that is retained within a machine-driven rotary pad without excessive splashing. The composition is generally a non-newtonian fluid or pseudoplastic fluid whose properties are dependent upon the shear exerted on the composition. One such composition was found to have a viscosity of 2,200 centipoise (2.2 pascal·seconds) at room temperature (about 25° C.) as measured using a Brookfield® Instruments Company Viscosimeter at 30 r.p.m. with a #3 spindle.

In its most preferred embodiment, the particulate abrasive is included within the compositions of the present invention in the form of an aqueous emulsion of the abrasive, fatty acid and neutralizing agent. In that emulsion, the fatty acid soap formed by the neutralization of the fatty acid with the alkaline neutralizing agent serves as a suspending agent for the abrasive particles. If needed for purposes of stability, minor amounts of other surfactants such as conventional synthetic nonionic or anionic surfactants may be included in the formulation of such an emulsion. In such an emulsion, it is preferred that the weight ratio of fatty acid to particulate abrasive in the emulsion be in the ratio of from about 1:2.5 to 1:3. Use of too low of a ratio of fatty acid can cause a reduction in gloss and an undesirable increase in the buffing time needed for the cream composition of the present invention. Use of too much fatty acid can produce a poor or unstable emulsion. Generally, it was found that neutralization to a pH of from about 7.5 to 8.5 gave useful emulsions. Formulation of such emulsions is well within the skill of a person of ordinary skill in the art of making emulsions containing suspended abrasives.

Likewise, the production of a cream composition of the present invention can be assisted by the addition of minor amounts (up to about 5% by weight) of other conventional surfactants such as synthetic nonionic, anionic, or amphoteric surfactants or combinations thereof to form suitable cream emulsions having the desired consistency for easy application to a floor surface. Surfactants also serve to help wet the surface of the stone floor being treated to improve the ability of the stone to be treated with the crystallizing and other compounds being applied. Examples of nonionic surfactants include polyethoxylated alkanols, phenols, and fatty acids, and alkyl amine oxides; anionic surfactants such as fatty acid salts other than those already noted above, alkyl sulfates and sulfonates; and amphoteric surfactants such as alkyl betaines. More preferred are the nonionic surfactants such as the polyethoxylated alkyl ethers. Amines such as triethanolamine can also help in the wetting of the stone surfaces.

Additional minor amounts of ingredients can also be included to improve the performance of the compositions of the present invention.

Up to about 10%, more preferably up to about 5%, by weight of the total composition can be inorganic or organic acids other than oxalic acid for the purpose of modifying the surface of the stone to make it more receptive to the crystallizing action of the silicofluoride compounds. Examples of such acids include phosphoric acid and tartaric acid.

Conventional hardness and/or color enhancing additives such as calcium chloride, stannic chloride, and zinc chloride can be included in minor amounts of up to about 5%, more preferably up to about 1%, by weight of the total composition to improve the surface hardness of the stone surface being treated.

Buffering compounds such as magnesium hydroxide can be added in amounts of up to about 5%, more preferably up to about 1%, in combination with other compounds such as weak acids and bases to maintain the pH of the compositions in the acidic range of from about 2 to 3, more preferably from 2.0 to 2.5 (the pH of a solution of 10% of the composition in water was about 2.6). This also assists in absorbing carbon dioxide released from the floor surface during the process of cleaning the floor. Compounds such as magnesium hydroxide are preferred because can additionally assist in the desirable formation of magnesium difluoride crystals in the marble during the crystallization reaction of the magnesium silicofluoride and the calcium carbonate in the marble.

Natural and synthetic wax aqueous emulsions can also be included in the compositions of the present invention in minor amounts of up to about 5%, more preferably less than about 1%, by weight of the total composition for the purpose of improving the application properties of the composition. Such emulsions can also help to speed up the buffing process of the rotary pad by acting as a slip lubricant. Such aqueous wax emulsions comprise waxes such as polyethylene waxes, a suspending aid such as oleic acid neutralized with dimethylethanolamine to form a suspending soap, water, and optionally, a preservative such as formaldehyde.

The compositions of the present invention can be prepared using standard mixing and blending techniques that are well known to those of ordinary skill in the art. The Examples give specific details on methods for preparing the compositions of the present invention.

This invention provides, in its more preferred embodiment, an aqueous cream composition for application to stone floors, especially those composed of marble or containing marble such as terrazzo, that returns the floor surface to the natural beauty and gloss of the original stone. These compositions are applied with conventional motor-driven rotary application pads of steel wool or plastic to both refinish and polish the stone floor surfaces to a high degree of gloss and depth of shine. They require less labor and less cleanup time than has been the case when either conventional acid-treating compositions based on oxalic acid or conventional maintenance compositions based on magnesium silicofluorides have been used.

The following Examples are provided to show various aspects of the present invention without departing from the scope and spirit of the invention. Unless otherwise indicated, all parts and percentages used in the following Examples are by weight. In the Examples, times are described where 3' means 3 minutes and 20" means 20 seconds; measurements are described where 5 in means 5 inches, 2 m means 2 meters and 6 mm means 6 millimeters; weights are described where 10 kg means 10 kilograms and volumes are described where 7 ml means 7 milliliters and 16 oz means 16 fluid ounces. "Room temperature" is about 20° C.

The following ingredients were used in the Examples:

Abrasive Emulsion A: Aqueous emulsion of 48% aluminum oxide, 12% Fatty Acid Mixture A; 1% oleic acid, 37% water and 2% Triethanolamine (85%); the emulsion had a viscosity in excess of 50,000 centipoise (50.0 pascal·seconds) at room temperature.

Aluminum Oxide: This abrasive contained 95% $Al_2O_3$, 1.5% $SiO_2$, 0.5% $Fe_2O_3$, and 3.0% $TiO_2$; had a mohs hardness of 9.0; and had an average particle size of +325 mesh (at least 98% of the aluminum oxide abrasive had an average particle size of less than 44 microns).

Calcium Chloride: calcium chloride containing at least 94% active material.

Fatty Acid Mixture A: A blend of 55% palmitic acid and 45% stearic acid that is prepared by crystallization in a solvent. It is made from the hydrogenation of stearic acid that is then vacuum distilled to obtain a product that contains about 40–45% oleic acid and about 10% linoleic acid in addition to the stearic acid. The vacuum-distilled product is stored in pails and cooled to 4° C. in a refrigerated chamber. The resulting chunks of solid product are wrapped in cloth and subject to moderate pressure in a hydraulic press. The liquid that is pressed out from this process is "red oil" and the resulting solid obtained is "stearic acid from a single press". In a similar way, three different grades of stearic acid are produced: one of a single pressure, one of double pressure and one of a triple pressure, which is of the best quality. For the purposes of this invention, the product of double pressure is preferred and was used; it contained more than about 3% of oleic acid.

Magnesium Hydroxide: magnesium hydroxide containing at least 97% active material.

Magnesium Silicofluoride: magnesium hexafluorosilicate hexahydrate.

Phosphoric Acid: concentrated phosphoric acid containing at least 75% phosphoric acid content and the balance water.

Polyethylene Wax: Oxidized polyethylene wax, Chemical Abstracts Service No. 68441-17-8, specific gravity of from 0.92–0.99 g/cm$^3$ and drop point (Mettler) of 219° F. (104° C.), obtained as AC-680 polyethylene wax from AlliedSignal of Morristown, N.J.

Silicone Fluid, 100 Cstks: Trimethylsiloxy-endblocked polydimethylsiloxane fluid of 100 centistoke (0.0001 m$^2$/s) viscosity identified as corresponding to Chemical Abstracts Registry No. CAS#63148-62-9 (CTFA Name: dimethicone).

Silicone Fluid, 500 Cstks: Trimethylsiloxy-endblocked polydimethylsiloxane fluid of 500 centistoke (0.0005 m$^2$/s) viscosity identified as corresponding to Chemical Abstracts Registry No. CAS#63148-62-9 (CTFA Name: dimethicone).

Silicone Fluid, 1000 Cstks: Trimethylsiloxy-endblocked polydimethylsiloxane fluid of 1000 centistoke (0.001 m2/s) viscosity identified as corresponding to Chemical Abstracts Registry No. CAS#63148-62-9 (CTFA Name: dimethicone).

Tartaric Acid: tartaric acid containing 99.5% active material.

Tergitol® 15-S-12: nonionic surfactant of CTFA name: Pareth 15-12 —a polyethylene glycol ether of a mixture of synthetic $C_{11}$-$C_{15}$ fatty alcohols with an average of 12 moles of ethylene oxide from Union Carbide Corporation of Danbury, Conn.

Triethanolamine (85%): Mixture of 85% triethanolamine and 15% diethanolamine.

Wax OA: Oxidized polyethylene wax with a specific gravity of 0.96 g/cm$^3$ obtained as Wax "OA" from BASF Corporation of Parsippany, N.J.

In the Examples, the 60° Gloss value was measured using a Model# JG-100 Glossmeter from Power DC, of Japan using 15 reading per square meter of floor surface measured and averaging the readings obtained to obtain the reported value.

EXAMPLE 1

Table I presents an overall formula for a presently preferred cream crystallizer composition of the present invention.

TABLE I

| Ingredients | Percent by Weight |
| --- | --- |
| Tergitol ® 15-S-12 | 0.20 |
| Magnesium Hydroxide | 0.30 |
| Phosphoric Acid | 2.12 |
| Calcium Chloride | 1.33 |
| Tartaric Acid | 3.00 |
| Magnesium Silicofluoride | 18.00 |
| Silicone Fluid, 500 Cstks | 0.25 |
| Triethanolamine (85%) | 1.224 |
| Aluminum Oxide | 33.624 |
| Fatty Acid Mixture A | 8.94 |
| Oleic Acid | 1.44 |
| Water | 29.572 |

This composition is prepared by preparing an aqueous emulsion of the abrasive, which is then used to prepare the final composition having a pH of from about 2.0–2.5. In the following, the amounts of each ingredient used are given in parts by weight according to percentages given in Table I.

The aqueous emulsion of the abrasive is prepared by placing the solid Fatty Acid Mixture A in a container and heating the container with steam for about 15–20 minutes until the Fatty Acid Mixture A is completely melted (final temperature is about 75°–81° C.). A portion of the water (27.072 parts) is placed in a second mixing container equipped with a spiral mixer and is heated to 80°–85° C. over a period of about 10–15 minutes. The Aluminum Oxide is then added to the water in the second container with mixing (mixer set at 29 r.p.m.) over about a 5 minute period (temperature of contents on completion is about 75°–80° C.). The Oleic Acid is then added to the mixing contents of the second container over about a 3 minute period while the temperature of the contents is maintained at about 75°–80° C. The heated, melted stearic acid is poured from the first container into the mixing contents of the second container over a period of about 3 minutes while the temperature of the contents is maintained at about 75°–80° C. The Triethanolamine is added to the contents of the second container with mixing and the contents are allowed to mix for 5 to 10 minutes maximum to form the aqueous emulsion of the abrasive having a pH of from about 7.5 to about 8.5.

The cream crystallizer composition is prepared by placing the remainder of the water (2.5 parts) in a mixing container equipped with a spiral mixer at 20°–25° C. and the mixer is started (40 r.p.m.). The Tergitol® 15-S-12 is added to the mixing water in the mixing container over 2–3 minutes at 20°–25° C. The Magnesium Hydroxide is then added to the mixing contents and allowed to mix for 10 minutes. The Phosphoric Acid is then added to the mixing contents of the container and allowed to mix for 10 minutes during which time the temperature rises to 50°–60° C. No heat is added, so the contents of the mixing container begins to decrease with time. The Silicone Fluid, 500 Cstks is then added to the mixing contents of the container and allowed to mix in over a five minute period at 40°–50° C. The Calcium Chloride is then added to the mixing contents of the container and allowed to mix in over 15–20 minutes (an increase in viscosity occurs as the mixing continues) at 25°–30° C. The mixer speed is increased from 40 r.p.m. to between 40–60 r.p.m. to insure good mixing as a result of the increase in viscosity of the contents. The Tartaric Acid is then added to mixing contents of the container and allowed to mix in over a 10 minute period at 25°–30° C. The Magnesium Silicofluoride is then added to the mixing contents of the mixing container and allowed to mix for 10 minutes at 25°–30° C. The aqueous emulsion of the abrasive is then added to the mixing contents and allowed to stir over a period of 10 minutes at a temperature of 25°–30° C. The resulting emulsion composition is then recirculated through a homogenizer for a period of 20 minutes to insure that the contents of the mixing container are completely mixed and a good emulsion is formed.

EXAMPLE 2

This comparative Example illustrates a conventional prior art oxalic-acid containing composition for resurfacing marble floors and the improvement in 60° Gloss angle on the floor surface after the composition is applied to the marble floor using machine-driven rotary floor polishing pads.

Example 2 contained 66% oxalic acid, 0.7% tin oxide polishing compound, 0.3% sodium bicarbonate and 33% of an aqueous emulsion polishing product. The aqueous emulsion polishing product contained 40% aluminum oxide abrasive, 7.8% stearic acid, 0.8% polyethylene wax, 1.3% petrolatum, 1.5% Pareth 15-12, 9.1% brightening (polishing) dust and 39.4% water.

Example 2 was applied to a test piece of black marble tile using the following procedure (which was also the same procedure used in the other Examples where a laboratory evaluation of gloss value is reported).

1. The surface of the tile is sanded under cold running water using No. 320-A wet sanding paper until the surface appears uniform.

2. The sanded tile surface is gently wiped with a soft sponge to remove any remaining grit.

3. Gloss readings on the sanded are taken (10 readings are taken and the average is reported as the initial gloss value). The target gloss reading for sanded tile surfaces is a 60° gloss value of no more than 5%.

4. A portion of the product to be tested is applied to the tile with a small portion of water and the surface is polished with an electric motor driven hand buffing machine for 3 minutes.

5. The surface of the tile is cleaned with water and absorbent paper to remove any residue.

6. The dry tile is inspected and gloss readings are taken (10 readings are taken and the average is reported as the final gloss value).

The initial 60° gloss value of the tile before treatment in the manner above was 13% and the final 60° gloss value after treatment with Example 2 was 69%.

EXAMPLE 3

The stone floor surface crystallizer composition described in Table II was a stable emulsion in the form of a white cream that was easy to apply and provided marble flooring with good 60° gloss and a rich marble color.

TABLE II

| Ingredients | Percent by Weight |
| --- | --- |
| Water | 2.5 |
| Tergitol 15-S-12 | 0.20 |
| Magnesium Hydroxide | 0.3 |
| Phosphoric Acid | 2.12 |
| Wax Emulsion A | 0.3 |
| Silicone Fluid, 500 Cstks | 0.25 |
| Calcium Chloride | 1.33 |
| Tartaric Acid | 3.00 |
| Magnesium Silicofluoride | 18.00 |
| Abrasive Emulsion A | 72.00 |

Example 3 was applied to a test piece of black marble tile using a procedure of the same type as described in Example 1. However, the Wax Emulsion A (not present in Example 1) was added after the addition of Phosphoric Acid and before addition of the Silicone Fluid, 500 Cstks. Another difference was that the last step described in Example 1 involving recirculation of the final product was not done for Example 3 because the equipment used to prepare this composition was not equipped to carry out recirculation through a homogenizer.

The initial 60° gloss value of the tile before treatment was 6% and the final 60° gloss value after treatment with Example 3 was 60%.

EXAMPLE 4

In these Examples, a comparison between the application of prior art Example 2 and inventive Example 3 was made on installed stone flooring surfaces that were in need of maintenance and were situated at various locations that were subject to commercial foot traffic. The compositions were applied using a commercial swing machine, motor driven rotary floor polishing machine running at 175 r.p.m. that weighed approximately 60–70 pounds (27.2–32.8 kg). The flooring surface was buffed using 3M Company Tan Polishing Pads for the evaluations reported in Tables III–V and 3M Company Red Polishing Pads for Tables VI–IX. The flooring surface was then rinsed to remove any dry composition residue left behind to reduce subsequent dulling of the floor surface by any such residue. The initial temperature of the flooring was about 70° F. (21.1° C.) and the final temperature immediately after application was about 85° F. (29.4° C.) due to the heat of the buffering operation. In the above evaluations, the application of Example 3 to the flooring surfaces was found to be easier and faster than that of Example 2. In all cases involving marble surfaces, the color of the flooring after treatment with Example 3 had a richer-looking color to the eye than was observed after the application of Example 2.

In the evaluations conducted in Tables III–V, 60° gloss values of the sections of flooring evaluated were measured before treatment and then after treatment of the area being tested after a specific amount of polishing time to evaluate the effect of polishing time on the gloss developed.

In the evaluations conducted in Tables VI–IX, an area of flooring was artificially with three grades of sandpaper—fine - 150 grit; medium - 100 grit, and coarse - 60 grit—to simulate Low, Medium and High, respectively, levels of damage to the flooring surface. In these evaluations, the floor surface was buffed for 9 minutes (until dry) followed by an additional 3 minutes of buffing.

TABLE III

Gray Marble Flooring

| Run No. | Example No. | Initial 60° Gloss | Final 60° Gloss | Floor Area (m²) | Buffing Time |
| --- | --- | --- | --- | --- | --- |
| 1 | 2 | 19 | 48 | 1.5 | 15 |
| 2 | 2 | 20 | 56 | 1.0 | 12 |
| 3 | 3 | 22 | 80 | 1.0 | 6 |
| 4 | 3 | 17 | 82 | 1.0 | 9 |
| 5 | 3 | 10 | 74 | 1.0 | 6 |
| 6 | 3 | 11 | 80 | 1.0 | 6 |
| 7 | 3 | 14 | 55 | 1.0 | 6 |
| 8 | 3 | 11 | 81 | 1.0 | 9 |
| 9 | 3 | 12 | 85 | 1.0 | 9 |
| 10 | 3 | 10 | 85 | 1.0 | 9 |

As shown in Table III, inventive Example 3 produced higher levels of gloss in a shorter period of time than did prior art Example 2 containing oxalic acid and abrasive. Run 7 was the lowest gloss reading for Example 3, but that was comparable to the best gloss reading obtained for Example 2 although Run 2 was polished twice as long.

TABLE IV

White Terrazzo Flooring

| Run No. | Example No. | Initial 60° Gloss | Final 60° Gloss | Floor Area (m²) | Buffing Time |
| --- | --- | --- | --- | --- | --- |
| 1 | 3 | 52 | 84 | 10 | 6 |
| 2 | 3 | 52 | 90 | 1.0 | 8 |
| 3 | 3 | 45 | 65 | 1.0 | 9 |

TABLE V

| Run No. | Example No. | Initial 60° Gloss | Final 60° Gloss | Floor Area (M²) | Buffing Time |
| --- | --- | --- | --- | --- | --- |
| 1 | 3 | 9 | 31 | 1.0 | 9 |

Good results were obtained on White Terrazzo that does contain marble pieces which granite showed the least improvement in gloss due to its nature.

TABLE VI

Brown Marble Flooring

| Run No. | Example No. | Sandpaper Damage | Initial 60° Gloss | Final 60° Gloss |
| --- | --- | --- | --- | --- |
| 1 | 3 | Fine | 36 | 82 |
| 2 | 3 | Medium | 26 | 93 |
| 3 | 3 | High | 20 | 90 |
| 4 | 2 | Fine | 46 | 69 |
| 5 | 2 | Medium | 33 | 70 |
| 6 | 3 | High | 32 | 74 |

TABLE VII

White Marble Flooring

| Run No. | Example No. | Sandpaper Damage | Initial 60° Gloss | Final 60° Gloss |
|---|---|---|---|---|
| 1 | 3 | Fine | 43 | 85 |
| 2 | 3 | Medium | 33 | 83 |
| 3 | 3 | High | 25 | 61 |
| 4 | 2 | Fine | 34 | 74 |
| 5 | 2 | Medium | 31 | 78 |
| 6 | 3 | High | 18 | 73 |

TABLE VIII

Black Marble Flooring

| Run No. | Example No. | Sandpaper Damage | Initial 60° Gloss | Final 60° Gloss |
|---|---|---|---|---|
| 1 | 3 | Fine | 51 | 91 |
| 2 | 3 | Medium | 34 | 88 |
| 3 | 3 | High | 20 | 88 |
| 4 | 2 | Fine | 42 | 61 |
| 5 | 2 | Medium | 42 | 65 |
| 6 | 3 | High | 13 | 64 |

TABLE IX

Green Marble Flooring

| Run No. | Example No. | Sandpaper Damage | Initial 60° Gloss | Final 60° Gloss |
|---|---|---|---|---|
| 1 | 3 | Fine | 36 | 68 |
| 2 | 3 | Medium | 34 | 66 |
| 3 | 3 | High | 14 | 56 |
| 4 | 2 | Fine | 22 | 27 |

After simulated damage using sandpaper, the brown, white and black marble flooring all showed better gloss values for Example than did prior art Example 2 except for Run 3 in Table VII on white marble that received high sandpaper damage.

EXAMPLE 5

The stone floor surface crystallizer composition described in Table X was prepared to have 12% magnesium silicofluoride.

TABLE X

| Ingredients | Percent by Weight |
|---|---|
| Water | 4.5 |
| Tergitol 15-S-12 | 0.20 |
| Magnesium Hydroxide | 0.3 |
| Phosphoric Acid | 2.12 |
| Wax Emulsion A | 0.3 |
| Silicone Fluid, 500 Cstks | 0.25 |
| Calcium Chloride | 1.33 |
| Tartaric Acid | 3.00 |
| Magnesium Silicofluoride | 12.00 |
| Abrasive Emulsion A | 76.00 |

The composition of Example 5 was evaluated on a marble tile floor. The initial 60° gloss value of the tile before treatment (no sanding of the tile was done) was 28% and the final 60° gloss value after treatment with Example 3 was 47%. Thus, treatment with this composition did improve the gloss value of the tile, but not as much as was typically seen for compositions containing 18% magnesium silicofluoride as in Example 3.

EXAMPLES 6–7

The stone floor surface crystallizer compositions described in Table XI were prepared with different types and amounts of silicone fluids.

TABLE XI

| Ingredients | Example 6 Percent by Weight | Example 7 Percent by Weight |
|---|---|---|
| Water | 2.0 | 2.0 |
| Tergitol 15-S-12 | 0.20 | 0.20 |
| Magnesium Hydroxide | 0.3 | 0.3 |
| Phosphoric Acid | 2.0 | 2.0 |
| Wax Emulsion A | 0.3 | 0.3 |
| Silicone Fluid, 100 Cstks | 0.87 | |
| Silicone Fluid, 1000 Cstks | | 0.75 |
| Calcium Chloride | 1.33 | 1.33 |
| Tartaric Acid | 3.00 | 3.00 |
| Magnesium Silicofluoride | 18.00 | 18.00 |
| Abrasive Emulsion A | 72.00 | 72.00 |

The compositions of Examples 6 and 7 were evaluated on marble tiles according to the test procedure of Example 2.

For Example 6, the initial 60° gloss value of the tile before treatment was 2% and the final 60° gloss value after treatment with Example 3 was 61%. The appearance of the tile after treatment was judged to be much less desirable than when the more preferred Silicone Fluid, 500 Cstks was used.

For Example 7, the initial 60° gloss value of the tile before treatment was 3% and the final 60° gloss value after treatment with Example 3 was 85%. The tile after treatment had a high gloss value, but was judged to be much slipperier than when the more preferred Silicone Fluid, 500 Cstks was used.

EXAMPLE 8

Stone floor surface crystallizer compositions of the type described in Example 3 were compared to commercial products for treating marble tile floors in this Example using the test procedure described in Example 2. The results obtained are reported in Table XII.

PASTA BLANCA™ marble floor restorer product was an abrasive- and oxalic acid-containing commercial product of the type described in Example 2 sold by S. C. Johnson & Son, Inc. in Mexico.

TERRASHINE™ marble floor crystallizer was an aqueous emulsion commercial product sold by S. C. Johnson & Son, Inc. in Mexico. TERRASHINE used 18% magnesium silicofluoride as the crystallizing agent along with 1% calcium chloride. It contained 3% tartaric acid and 2% phosphoric acid along with 0.3% magnesium hydroxide and a polyethoxylated surfactant and small amounts of wax emulsions, but did not contain any abrasive or oxalic acid. It was intended for use from time to time to maintain the finish of marble floors between treatments with oxalic acid-containing products.

TABLE XII

| Products Used | Initial 60° Gloss Value | Final 60° Gloss Value |
|---|---|---|
| PASTA BLANCA Product | 3% | 63% |
| TERRASHINE Product | 2% | 24% |
| PASTA BLANCA followed by treatment with TERRASHINE Product | 3% | 71% |

TABLE XII-continued

| Products Used | Initial 60° Gloss Value | Final 60° Gloss Value |
|---|---|---|
| Example 3 | 2% | 74% |
| Example 3 followed by TERRASHINE Product | 2% | 85% |

Table XII shows that the compositions of Example 3 perform better than the oxalic acid-containing products without the disadvantages of having to use such products.

Even better gloss was obtained when Example 3 was followed by a TERRASHINE product treatment. Thus a more preferred way of using the composition of the present invention is to use it in combination with a product such as TERRASHINE which can be used to maintain the appearance of the stone, especially marble or terrazzo, floor.

Example 3 contains both an abrasive and a silicone fluid not found in prior art silicofluoride-containing compositions and shows advantages over such compositions as well as over compositions containing oxalic acid that did contain abrasives.

That which is claimed is:

1. A stone floor surface crystallizer composition comprising
   A. from about 12% to 25% by weight, based upon the total weight of the composition, of a silicofluoride crystallizing agent;
   B. from about 15% to 25% by weight, based upon the total weight of the composition, of at least one fatty acid selected from the group consisting of natural or synthetic fatty acids containing from about 16 to 22 carbon atoms;
   C. from about 25% to 45% by weight, based upon the total weight of the composition, of at least one particulate abrasive;
   D. from about 80% to 140%, based upon the stoichiometric amount of carboxyl groups present in the fatty acid of the composition, of at least one alkaline neutralizing agent for fatty acid (B);
   E. from about 0.1% to 2% by weight, based upon the total weight of the composition, of a silicone fluid having a viscosity of from about 100 to 2000 centistokes at 20° C.; and
   F. the balance of the composition comprising water.

2. The composition of claim 1 wherein the amount of crystallizing agent present is from about 15% to 20%: the amount of fatty acid present is from about 18% to 22%; the amount of abrasive is from about 25% to 35%; the amount of alkaline neutralizing agent is from about 90% to 130% of the stoichiometric amount, and the amount of silicone fluid is from about 0.1% to about 1% and the silicone fluid has a viscosity of from 100 to 1000 centistokes at 20° C.

3. The composition of claim 2 wherein the crystallizing agent is magnesium silicofluoride or zinc silicofluoride; the fatty acid contains from about 16 to 18 carbons atoms; the alkaline neutralizing agent is a volatile amine or ammonium hydroxide; and the silicone fluid is a polydimethylsiloxane fluid.

4. The composition of claim 3 wherein the crystallizing agent is magnesium silicofluoride; the fatty acid contains 18 carbon atoms; and the polydimethylsiloxane fluid is trimethylsiloxy-endblocked.

5. The composition of claim 1 wherein the amount of crystallizing agent present is 18%; the amount of fatty acid present is about 20%; the amount of abrasive is from about 30% to 35%; the amount of alkaline neutralizing agent is from about 100% to 130% of the stoichiometric amount; and the amount of silicone fluid is from about 0.1% to 0.5% and silicone fluid has a viscosity of from 100 to 1000 centistokes at 20° C.

6. The composition of claim 5 wherein the crystallizing agent is magnesium silicofluoride or zinc silicofluoride; the fatty acid contains from about 16 to 18 carbons atoms; the alkaline neutralizing agent is a volatile amine or ammonium hydroxide; and the silicone fluid is a polydimethylsiloxane fluid.

7. The composition of claim 6 wherein the crystallizing agent is magnesium silicofluoride; the fatty acid contains 18 carbon atoms; the abrasive is aluminum oxide; and the polydimethylsiloxane fluid is trimethylsiloxy-endblocked and pas a viscosity of about 500 centistokes.

8. The composition of claim 1 wherein an aqueous emulsion of the abrasive comprising a portion of the water present, the abrasive, the fatty acid and the neutralizing agent is prepared and the composition is prepared by adding the silicofluoride crystallizing agent and the silicone fluid together along with the aqueous emulsion of the abrasive.

9. A method of improving the appearance of stone floors wherein the improvement comprises the application of a stone floor surface crystallizer composition to a stone floor surface with a motor-driven application pad, said composition, comprising
   A. from about 12% to 25% by weight based upon the total weight of the composition, of a silicofluoride crystallizing agent
   B. from about 15% to 25% by weight, based upon the total weight of the composition, of at least one fatty acid selected from the group consisting of natural or synthetic fatty acids containing from about 16 to 22 carbon atoms;
   C. from about 25% to 45% by weight, based upon the total weight of the composition, of at least one particulate abrasive;
   D. from about 80% to 140%, based upon the stoichiometric amount of carboxyl groups present in the fatty acid of the composition, of at least one alkaline neutralizing agent for fatty acid (B);
   E. from about 0.1% to 2% by weight, based upon the total weight of the composition, of a silicone fluid having a viscosity of from about 100 to 2000 centistokes at 20° C.; and
   F. the balance of the composition comprising water.

10. The method of claim 9 wherein the amount of crystallizing agent present is from about 15% to 20%; the amount of fatty acid present is from about 18% to 22%; the amount of abrasive is from about 25% to 35%; the amount of alkaline neutralizing agent is from about 90% to 130% of the stoichiometric amount; and the amount of silicone fluid is from about 0.1% to about 0.5% and the silicone fluid has a viscosity of from 100 to 1000 centistokes at 20° C.

11. The method of claim 10 wherein the crystallizing agent is magnesium silicofluoride or zinc silicofluoride; the fatty acid contains from about 16 to 18 carbons atoms; the alkaline neutralizing agent is a volatile amine or ammonium hydroxide; and the silicone fluid is a polydimethylsiloxane fluid.

12. The method of claim 11 wherein the crystallizing agent is magnesium silicofluoride; the fatty acid contains 18 carbon atoms; and the polydimethylsiloxane fluid is trimethylsiloxy-endblocked.

13. The method of claim 9 wherein the stone floor is a marble or a terrazzo floor and wherein the amount of crystallizing agent present Is 18%; the amount of fatty acid present is about 20%; the amount of abrasive is from about 30% to 35%; the amount of alkaline neutralizing agent is from about 100% to 130% of the stoichiometric amount; and the amount of silicone fluid is from about 0.1% to 0.5% and the silicone fluid has a viscosity of from 100 to 1000 centistokes at 20° C.

14. The method of claim 13 wherein the crystallizing agent is magnesium silicofluoride or zinc silicofluoride; the fatty acid contains from about 16 to 18 carbons atoms; the alkaline neutralizing agent is a volatile amine or ammonium hydroxide; and the silicone fluid is a polydimethylsiloxane fluid.

15. The method of claim 14 wherein the crystallizing agent is magnesium silicofluoride; the fatty acid contains 18 carbon atoms; the abrasive is aluminum oxide; and the polydimethylsiloxane fluid is trimethylsiloxy-endblocked and has a viscosity of about 500 centistokes.

16. The method of claim 9 wherein an aqueous emulsion of the abrasive comprising a portion of the water present the abrasive, the fatty acid and the neutralizing agent is prepared and the composition is prepared by adding the silicofluoride cystallizing agent and the silicone fluid together along with the aqueous emulsion of the abrasive.

17. The composition of claim 1 wherein the silicone fluid is a polydimethylsiloxane fluid.

18. The method of claim 9 wherein the silicone fluid is a polydimethylsiloxane fluid.

* * * * *